United States Patent [19]
Auclair et al.

[11] Patent Number: 5,778,418
[45] Date of Patent: Jul. 7, 1998

[54] MASS COMPUTER STORAGE SYSTEM HAVING BOTH SOLID STATE AND ROTATING DISK TYPES OF MEMORY

[75] Inventors: Daniel L. Auclair, Mountain View; Eliyahou Harari, Los Gatos, both of Calif.

[73] Assignee: SanDisk Corporation, Sunnyvale, Calif.

[21] Appl. No.: 287,107

[22] Filed: Aug. 8, 1994

Related U.S. Application Data

[63] Continuation of Ser. No. 767,106, Sep. 27, 1991, abandoned.
[51] Int. Cl.$^6$ ............................................. G06F 12/00
[52] U.S. Cl. ..................... 711/101; 711/4; 711/103; 711/153; 711/112; 711/202; 711/111
[58] Field of Search .......................... 395/425, 833, 395/497.01, 497.04, 430, 439, 500, 550; 364/DIG. 1; 365/185, 104, 189.01; 711/101, 4, 103, 111, 112, 153, 202

[56] References Cited

U.S. PATENT DOCUMENTS

| | | | |
|---|---|---|---|
| 4,084,230 | 4/1978 | Matick | 711/5 |
| 4,210,959 | 7/1980 | Wozniak | |
| 4,295,205 | 10/1981 | Kunstadt | |
| 4,366,539 | 12/1982 | Johnson et al. | 711/218 |
| 4,456,971 | 6/1984 | Fukuda et al. | |
| 4,617,624 | 10/1986 | Goodman | |
| 4,642,759 | 2/1987 | Foster | |
| 4,682,305 | 7/1987 | Iishikawa | 711/111 |
| 4,785,425 | 11/1988 | Lavelle | |
| 4,843,542 | 6/1989 | Dashiell et al. | 711/119 |
| 4,896,262 | 1/1990 | Wayama et al. | |
| 4,949,240 | 8/1990 | Iijima | |
| 4,964,039 | 10/1990 | Izawa et al. | 395/500 |
| 5,033,027 | 7/1991 | Amin | |
| 5,043,940 | 8/1991 | Harari | |

(List continued on next page.)

FOREIGN PATENT DOCUMENTS

| | | |
|---|---|---|
| 0557723 | 6/1984 | Australia. |
| 0220718 | 5/1987 | European Pat. Off. |

OTHER PUBLICATIONS

Hancock, R.J., "Architecting A CCD Replacement For The IBM 2305 Fixed Head Disk Drive," *IEEE*, 1979, pp. 182–184.

Clewett, R., "Bubble Memories As A Floppy Disk Replacement," *1978 MIDCON Technical Papers*, vol. 2, Papers Presented at MIDCON/78, The Midwest Electronic Show and Convention, Dallas, Texas, Dec. 12–14, 1978.

Miller, A.R., "Semidisk Disk Emulator," *Interface Age Magazine*, vol. 7, ISSN, pp. 102,104,106 and 159, (Nov. 1982).

Brochure: "Wafer–Stack Wafer Scale Storage Subsystem," Anamartic, Inc., 1990.

Auclair, D., "Optimal Solid State Disk Architecture for Portable Computers," *Silicon Valley PC Design Conference (SVPC)*, Jul. 9–10, 1991, pp. 811–815.

*Primary Examiner*—Tod R. Swann
*Assistant Examiner*—J. Peikari
*Attorney, Agent, or Firm*—Majestic, Parsons, Siebert & Hsue

[57] ABSTRACT

Solid-state flash electrically erasable and programmable read-only-memory ("flash EEPROM") system is combined with a rotating disk drive memory to provide mass program and data storage in a computer system. A common memory controller directs system generated memory addresses in a disk format to either the EEPROM system or disk memory. The blocks of data handled by the EEPROM system have the same size and other attributes as sectors of data handled by the disk system, thereby making it transparent to the computer system processor as to whether it is accessing the EEPROM or disk portion of the storage system. A particular program or data file may then be stored in the portion of the memory system best suited to handle it, and thus take advantage of the different features and characteristics of EEPROM and magnetic media disk memory.

18 Claims, 6 Drawing Sheets

U.S. PATENT DOCUMENTS 5,070,474 12/1991 Tuma et al. .
5,097,437 3/1992 Larson ................................. 395/595
5,168,465 12/1992 Harari ................................. 257/320
5,226,168 7/1993 Kobayashi et al. .
5,291,584 3/1994 Challa et al. .
5,297,148 3/1994 Harari et al. .

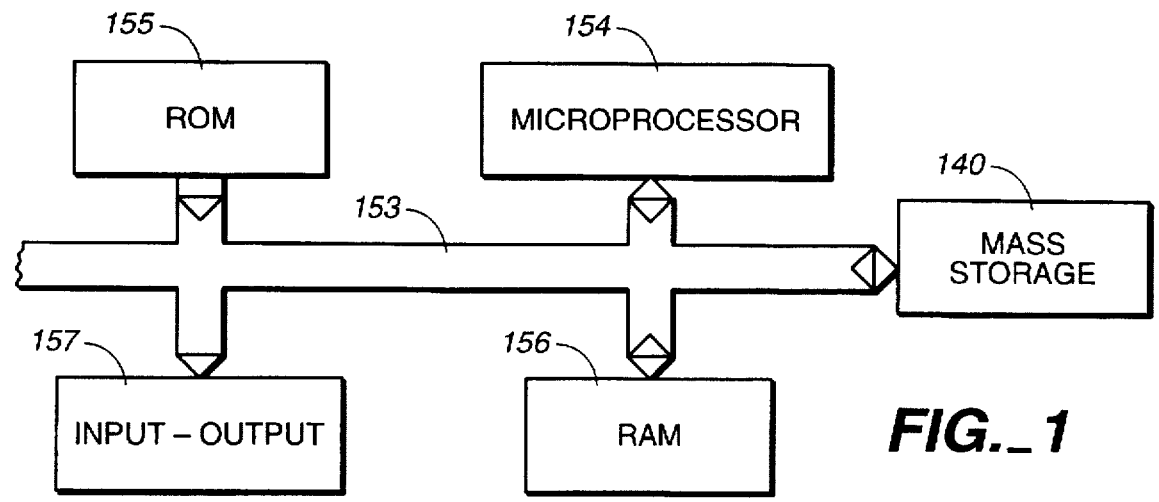
FIG._1
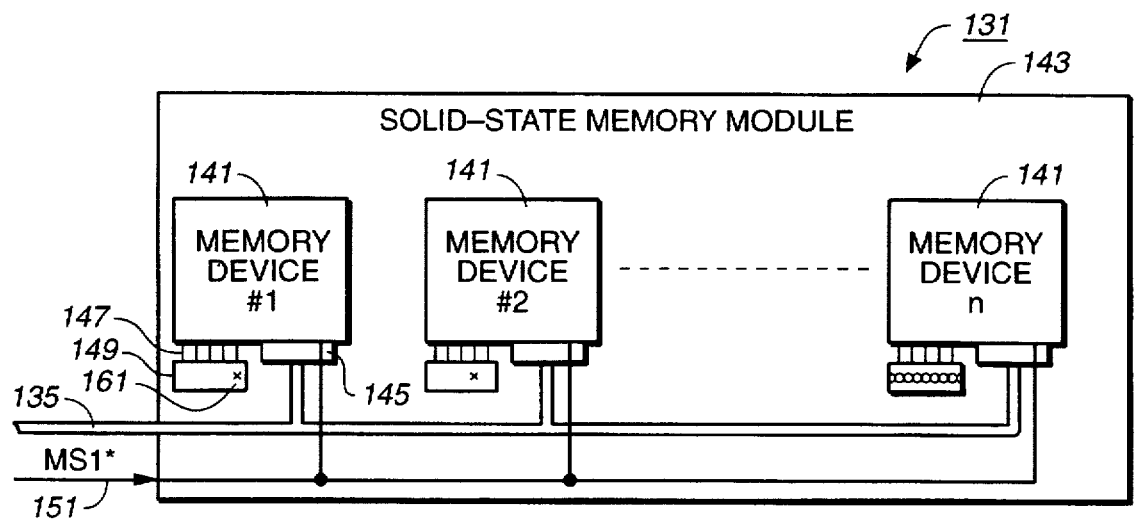
FIG._3

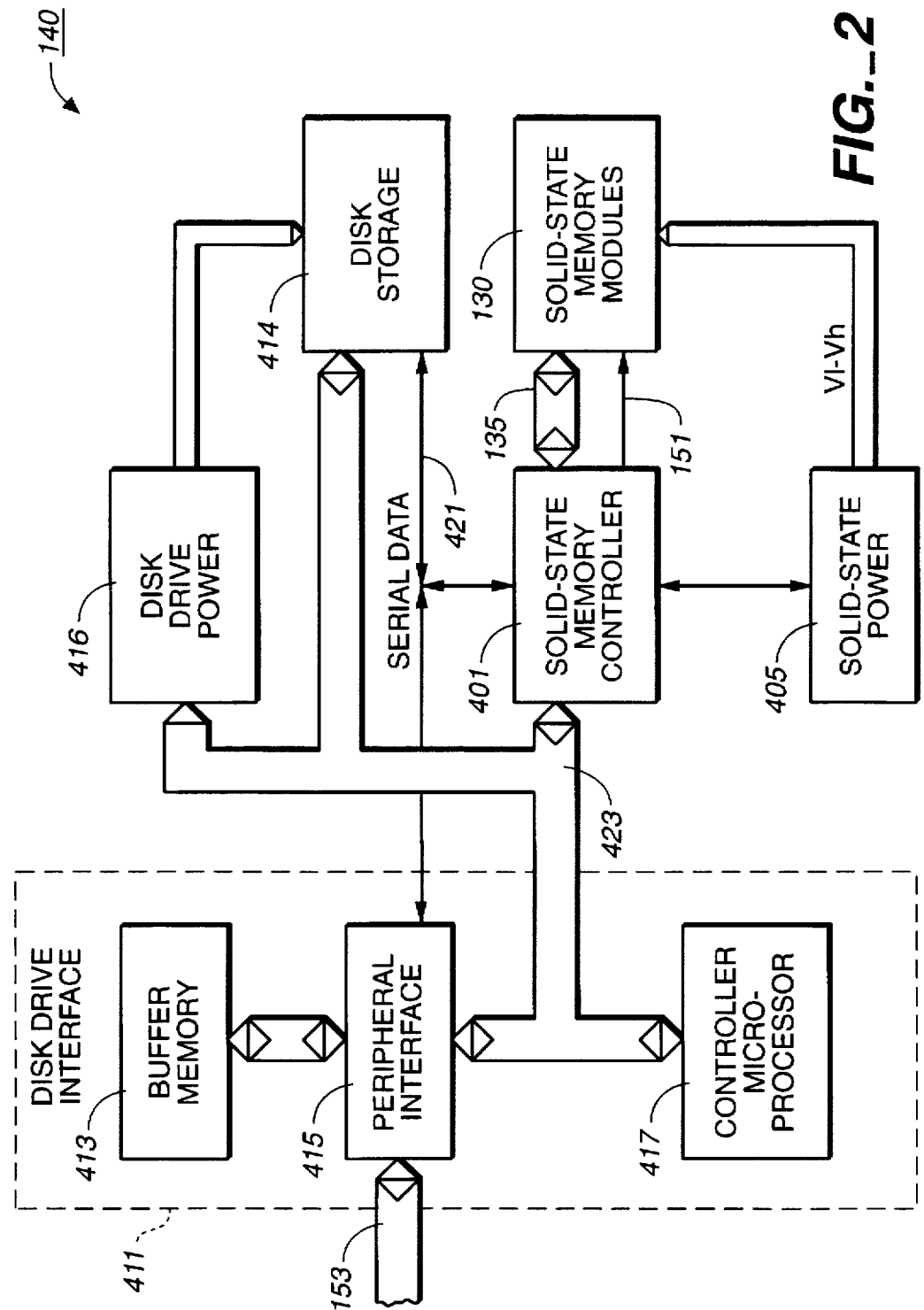
FIG._2

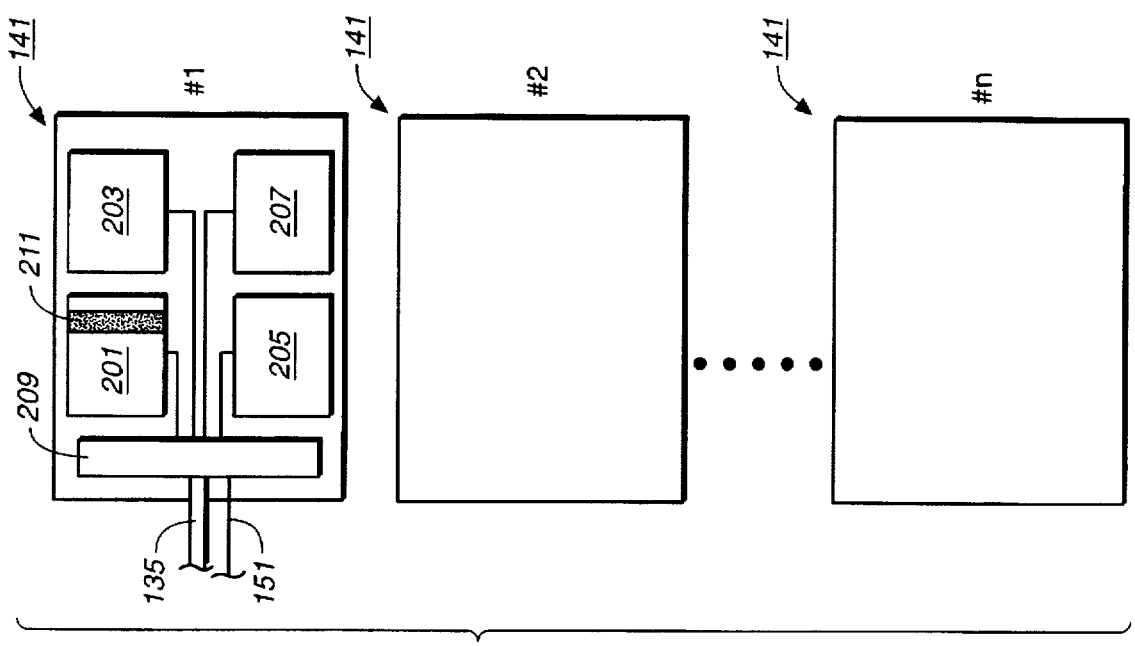
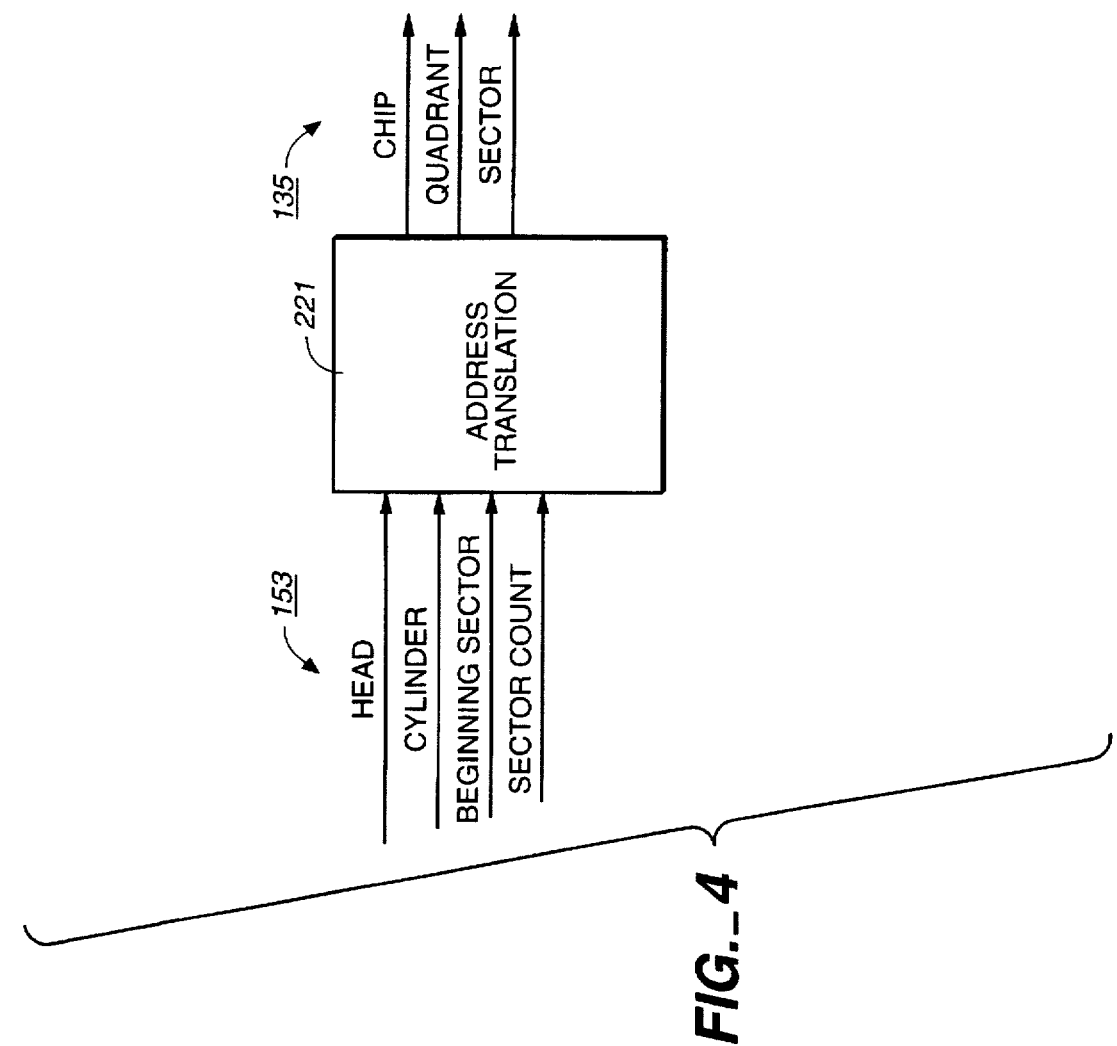
FIG._4

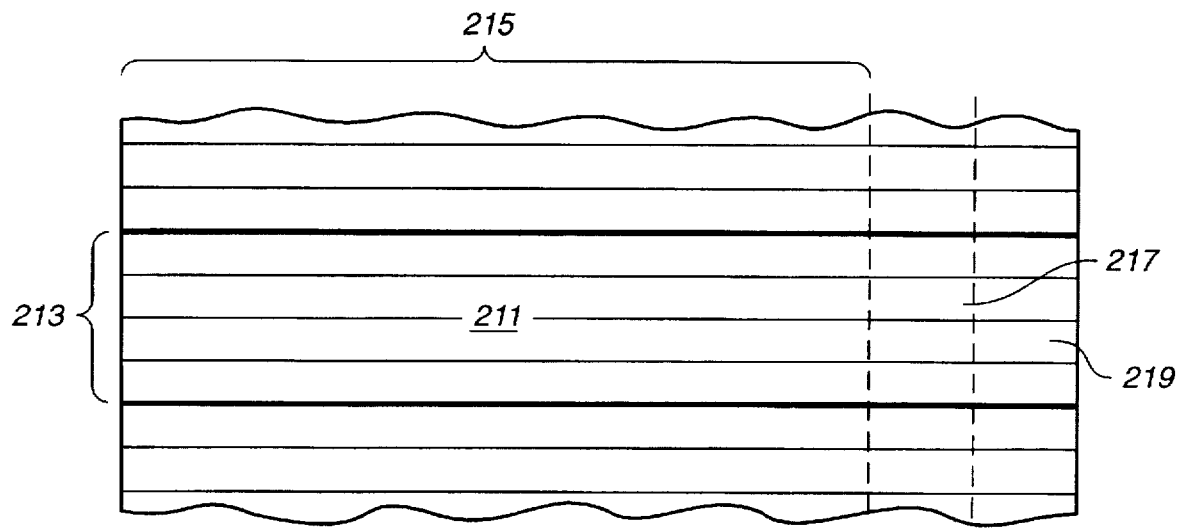
FIG._5
| STATUS | COMMAND |
|---|---|
| DRIVE AND HEAD ADDRESS (READ) | DRIVE AND HEAD ADDRESS (WRITE) |
| LOW CYLINDER ADDRESS (READ) | LOW CYLINDER ADDRESS (WRITE) |
| HIGH CYLINDER ADDRESS (READ) | HIGH CYLINDER ADDRESS (WRITE) |
| STARTING SECTOR ADDRESS (READ) | STARTING SECTOR ADDRESS (WRITE) |
| SECTOR COUNT (READ) | SECTOR COUNT (WRITE) |
FIG._6

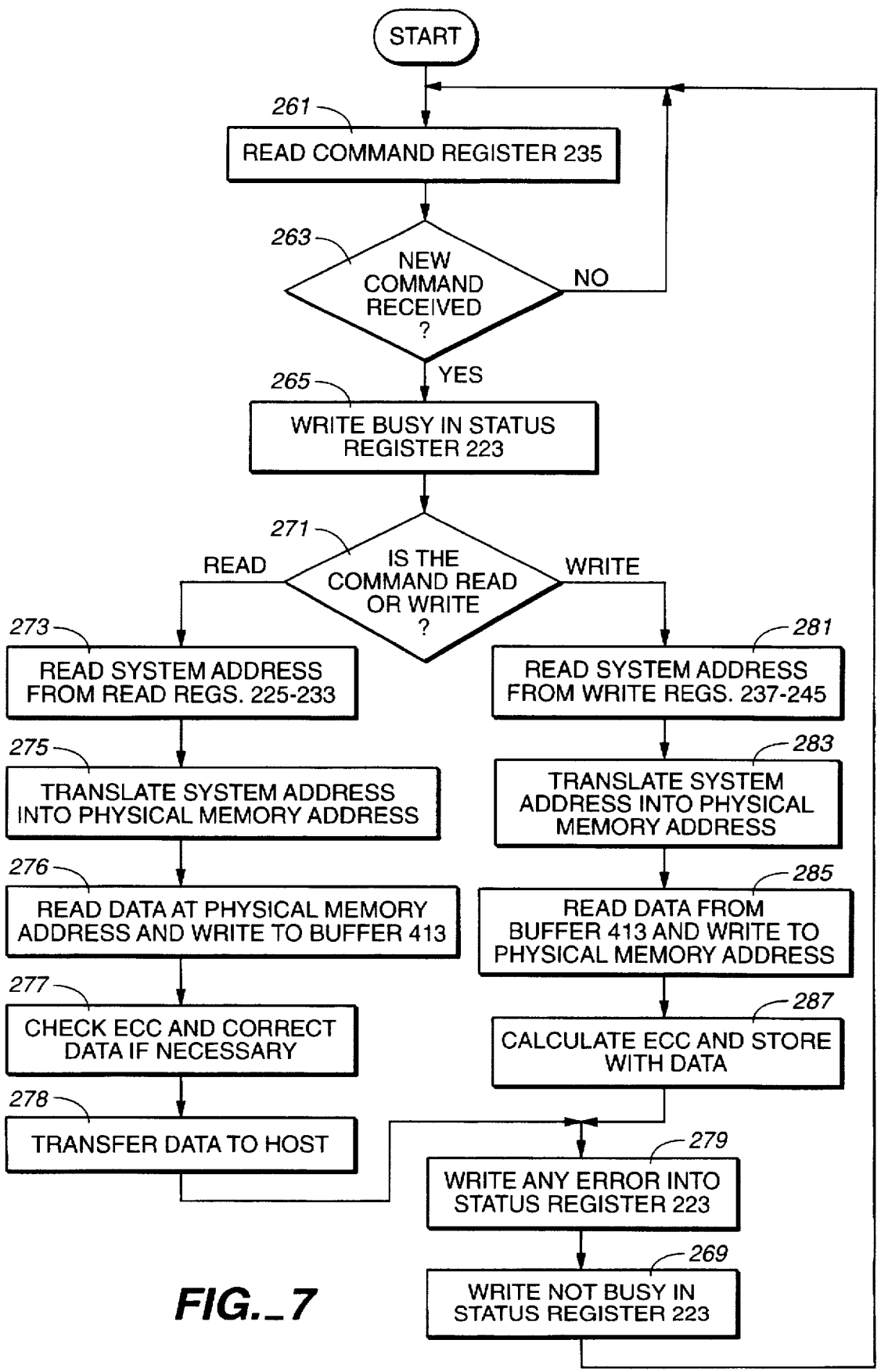
FIG._7

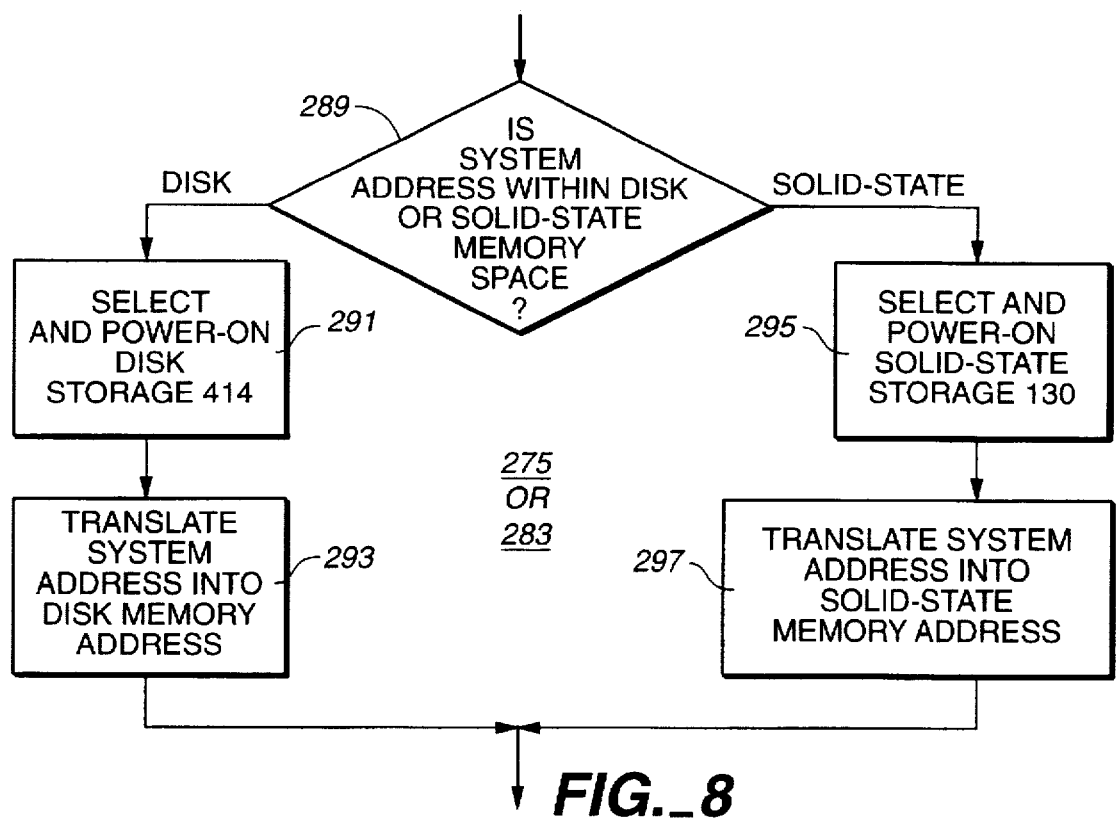
FIG._8
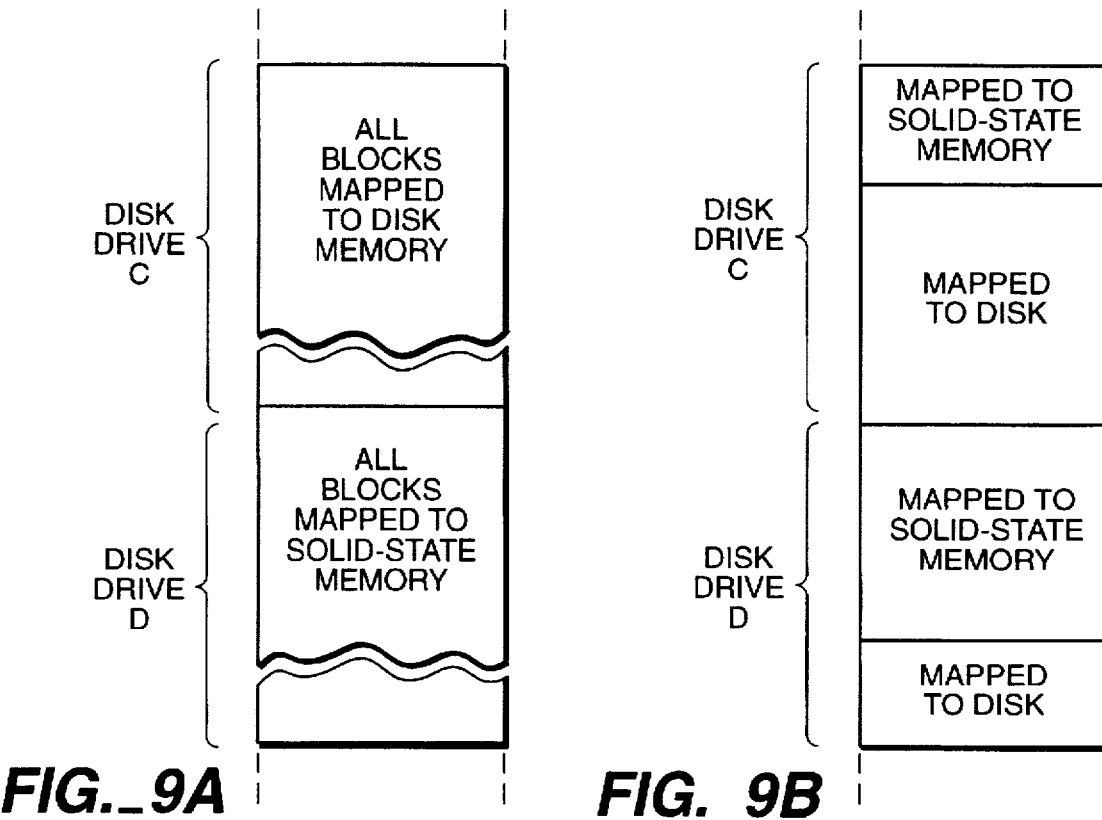
FIG._9A  FIG. 9B

MASS COMPUTER STORAGE SYSTEM HAVING BOTH SOLID STATE AND ROTATING DISK TYPES OF MEMORY

CROSS-REFERENCE TO RELATED APPLICATION

This application is a continuation of application Ser. No. 07/767,106, filed Sep. 27, 1991, now abandoned, which is hereby incorporated herein by this reference.

BACKGROUND OF THE INVENTION

This invention relates generally to techniques of mass storage in computer systems, and more specifically, to the optimization of such systems with regard to characteristics such as power consumption, physical ruggedness, access time, and the like.

The most common computer mass storage device currently in use is a hard disk drive. As is well known, one or more rotating disks include magnetic storage material coated on at least one, and usually both sides, of each disk. At least one magnetic read/write head is provided for each disk side and made to be radially movable across its surface as the disk is rotated at a uniform speed. Data is magnetically recorded on the disk surfaces on concentric tracks. Each track is divided around its circumference into several sectors, each sector storing a block of data of a predetermined size, most commonly 512 bytes plus overhead information related to the block of data. A given sector is addressed by specifying its disk drive, accessing head, cylinder and sector number. The cylinder and head information, in effect, together designate a tract on a disk surface where the designated cylinder intersects the surface.

Hard disk drives are capable of storing a large amount of information, in the order of hundreds of megabytes of data, in a small package and at a low cost. Disk drives have their disadvantages, however, such as a slow access time relative to that of solid state random-access-memory ("RAM"), being subject to a limited life because of wear on mechanical elements, having a low tolerance for mechanical shock relative to that of solid state memories, and requiring significantly greater amounts of power in order to rotate the disk and move the read/write heads.

As a result, non-volatile solid-state memory systems are being introduced into the market place to take the place of part or all of the disk storage capacity of a mass storage system in particular applications. The technology being utilized is flash electrically erasable and programmable read-only-memory ("flash EEPROM"). With this technology, arrays of memory cells are provided wherein each cell is formed of a transistor having at least a portion of its gate electrically floating, the charge on the floating gate thus controlling the conduction of the transistor and its detectable state. Arrays of tens of megabytes of such cells are being provided in very small packages, and the capacity is increasing. The power requirements of flash EEPROM memory are very low, they are physically rugged, have no mechanical parts which wear out, and in overall operation provide faster average access time when compared with disk drive memory. However, flash EEPROM memory is currently much more expensive per byte than disk storage, thus limiting its application to situations where its advantages are very important.

It is a principal object of the present invention to provide a mass storage system which combines both disk and Flash EEPROM systems in a manner which takes advantage of the strengths of each type of memory.

It is a further object of the present invention to provide such mass storage for use in a computer without the need of any significant alteration in the computer system operating software system.

SUMMARY OF THE INVENTION

These and additional objects are accomplished by the present invention, wherein, briefly and generally, a flash EEPROM system and a rotating disk drive memory are combined with a common memory controller circuit to form the mass storage system. The common controller circuit maps the usual disk drive addresses from the computer processor operating software system to locations within the disk storage media or flash EEPROM system. When designating the flash EEPROM system, the controller further translates the address from a disk drive format into the form required for addressing the solid state memory array. The flash EEPROM memory is divided into separately addressable units, each unit being allocated to store a block of data plus overhead information related to that block. This appears to the host processor operating system to be the same as a disk drive; that is, each unit of flash EEPROM memory serves the same function as a sector of disk drive memory.

The addition of flash EEPROM memory to a controller that is common with the disk drive memory does not alter the way in which the computer operating system deals with the overall memory. Since flash EEPROM memory is accessed in the same way as the disk drive memory, the common controller's allocation of certain operating system addresses between flash EEPROM units and disk drive sectors is transparent to the operating system. This allows a mass storage system to utilize the advantages of both types of memory without any significant change being necessary to the host processor operating system.

Many specific applications of such a combined memory system are possible. In applications where electrical power is limited, such as in portable battery operated computer systems, the most actively accessed program or data is stored in the flash EEPROM memory while the disk drive remains unpowered until it is needed. This also reduces the exposure to disk drive damage from mechanical shock to the system and increases the overall life of the mass storage system.

Memory locations designated by the operating system to be within a single disk drive can all be directed by the common controller to either the flash EEPROM or disk system. For example the logical C-drive designated by a computer system can be contained in the flash EEPROM memory while the D-drive is contained in disk memory. Software and data is then stored by the user on either the logical C or D disk drive depending upon how often it is read, how often it is rewritten, and similar factors. Alternatively, the common controller can direct some memory locations designated by the operating system within the C-drive to flash EEPROM memory space and other block addresses within the C-drive to disk memory, and similarly with other designated disk drives, depending upon the specific application.

Additional objects, advantages and features of the present invention will become apparent from the following description of its preferred embodiment, which description should be taken in conjunction with the accompanying drawings.

BRIEF DESCRIPTION OF THE DRAWINGS

FIG. 1 shows a computer system of the type that utilizes the improved mass storage system of the present invention;

FIG. 2 shows in block diagram form an example of a mass storage of the computer system of FIG. 1 in which utilizes the present invention;

FIG. 3 illustrates an example of the flash EEPROM memory module of the mass storage system of FIG. 2;

FIG. 4 further illustrates operation of the flash EEPROM memory in the mass storage system of FIG. 2;

FIG. 5 conceptually illustrates the allocation of flash EEPROM memory used in the mass storage system of FIG. 2;

FIG. 6 illustrates the registers that exist in available peripheral interface circuit chips of a type usable in a common controller of the mass storage system of FIG. 2;

FIG. 7 shows in flowchart form the operation of the common controller of the mass storage system of FIG. 2;

FIG. 8 expands upon a step of the common controller operation illustrated in FIG. 7; and FIGS. 9A and 9B conceptually illustrate alternative schemes for mapping computer system addresses into the Flash EEPROM and disk memory portions of the mass storage system of FIG. 2.

DESCRIPTION OF A PREFERRED EMBODIMENT

Referring initially to FIG. 1, a typical computer system of the type utilizing the improved mass storage techniques of the present invention is illustrated very generally. Such a system includes a microprocessor 154, ROM 155, RAM 156 and various input/output circuits 157, all connected with a common bus 153. A mass storage system 140 utilizing the improvements of the present invention is also connected to the system computer bus 153. The bus 153 is intended to include address and data bus portions as well as the various control and status circuits utilized in a particular computer system. A mass storage system 140 would generally, prior to the present invention, be a single, large capacity hard disk drive.

FIG. 2 shows a preferred form of the mass storage system 140 of FIG. 1. A single disk drive interface 411 serves both a solid state flash EEPROM system 130 and a hard disk drive system 414. The interface 411 utilizes a commercially available peripheral interface chip 415 that communicates with the computer system bus 153. The peripheral interface 415 transfers data between the host computer and the two types of memory. A serial data link 421 communicates data both to (during a write operation) and from (during a read operation) a flash EEPROM memory controller 401 and the disk drive 414. A microprocessor 417 controls the peripheral interface 415, the memory controller 401 and the disk drive 414 over an internal bus 423. The microprocessor 417 causes only one of the disk drive 414 or flash EEPROM system 130 to be enabled at a time during a read or write operation. A certain range or ranges of memory addresses are mapped into the flash EEPROM system 130 and other non-overlapping range or ranges are mapped into the disk drive 414. The controller interface 411 makes the decision whether a certain memory access address requested by the computer system processor 154 lies within the designated flash EEPROM address space or the disk memory address space, and then renders operable a connection of the data path circuit 421 with the selected memory type. The buffer memory 413 is static RAM and provides temporary storage of data being transferred between the memory unit 123 and the host computer system.

An example of the peripheral interface circuit 415 is an SH 265 disk controller chip available from Cirrus Logic, Inc. An example of the microprocessor 417 is a Motorola, Inc. 68HC11 part. The disk drive 414 can be of any suitable commercially available type. Details of the flash EEPROM controller 401 are given in the copending patent application Ser. No. 07/736,733, filed Jul. 26, 1991, which is incorporated herein by this reference. The description with respect to FIG. 8A of this copending application is particularly pertinent.

The combination of the disk drive interface 411 and the disk drive 414 operate conventionally when an address within the disk memory address space is designated by the host system. But the addition of the flash EEPROM memory 130 and its associated controller 401 requires some modification of the controlling program of the microprocessor 417 so that addresses within the memory space of the solid state memory are directed to it instead of to the disk drive. The structure and operation of the solid state memory portion of the mass storage system of FIG. 2 will now be explained.

The flash EEPROM memory system 130 includes at least one, and preferably a plurality, of memory modules 131 of the type illustrated in FIG. 3. Each memory module 131 includes a plurality of EEPROM integrated circuit chips 141 physically connected together on a sub-board 143. Each of the memory chips is connected with the flash EEPROM controller 401 over lines 135. Each of the memory chips 141 is programmed with a unique address by connection with a plurality of pads, such as the pads 147 on one of the devices, being controlled by selectively grounding them on mount 149. This flash EEPROM architecture is also more fully described by aforementioned copending patent application Ser. No. 07/736,733, particularly with respect to FIG. 2A thereof.

Referring to FIG. 4, each of the EEPROM integrated circuits is formed on a small substrate chip with memory cells arranged in rows and columns in quadrants 201, 203, 205 and 207. These individual quadrant arrays are connected through interface circuits 209 to the controller lines 135 and a line 151. Each of the memory cells within a given quadrant, such as the quadrant 201, is addressable by proper voltages applied to intersecting column bit and row driver lines. A sector of such memory cells contiguously arranged, such as a sector 211 shown as part of the quadrant 201, is erasable simultaneously by addressing the sector.

Referring to FIG. 5, the typical sector 211 is shown to be formed of four rows 213 of memory cells. Each row includes a length 215 of enough cells to store 128 bytes of user data and an additional 16 bytes of storage capacity in regions 217 and 219 for sector overhead information and to provide spare cells for the sector. Thus, the sector 211 stores 512 bytes of user data, the same capacity as a sector of disk storage according to prevailing disk standards and that which is utilized in the disk storage system 414 (FIG. 2). This then allows the flash EEPROM system 130 to be accessed by the host processor in the same manner as it accesses the disk system 414. No change or accommodation is required in a usual computer system operating software in order to use the flash EEPROM system.

A number of sectors with a format of the sector 211 are provided adjacent to each other, each of which is separately addressable and erasable by a single command. An additional 8 bytes of disk storage is provided in the region 217 as an extension of each row of EEPROM cells of the sector 211 for the purpose of providing spare EEPROM cells to replace bad cells within the sector 211. Similarly, another 8 bytes in the region 219 stores header, other common overhead information required for each sector, one or more error correction codes ("ECCs"), and the like. A preferred flash EEPROM data and header structure is described more fully in copending patent application Ser. No. 07/759,497, filed Sep. 13, 1991, which is incorporated herein by this reference. This flash EEPROM header format allows the host processor to deal with the solid-state memory in an identical manner as it deals with the disk memory. Further, additional details of the memory system operation can be had by reference to published international patent applications of the assignee hereof, namely European publication no. 392, 895, dated Oct. 17, 1990, and PCT publication no. WO 90/12400, dated Oct. 18, 1990.

The number of EEPROM cells, and thus the number of sectors, in each of the quadrants 201, 203, 205 and 207 (FIG. 4) is preferably made to be the same. A given sector of cells is addressed by first designating the integrated circuit chip, its quadrant and then the sector within the quadrant.

FIG. 4 additionally illustrates the manner in which the individual EEPROM integrated circuit chips 141 are addressed in order to read or write data in response to commands from the system processor. A box 221 indicates a translation of the addresses applied to the memory system over the system bus 153 that are within the flash EEPROM system. The address from the host computer designates, in usual disk drive format, a disk drive head that is to be utilized for the data transfer, a data cylinder, a beginning sector number on that cylinder, and the number of contiguous sectors (sector count) in which the data is being read or written. The memory controller translates that address, as shown on the right hand side of block 221 of FIG. 4, into a chip number, the quadrant on the chip and a sector of memory cells within that quadrant that is to be addressed. If more than one sector of data is being transferred during a single access by the host computer, a number of EEPROM sector accesses equal to the disk sector count is accomplished.

This address translation is performed by the interface 411 through microprocessor 417. The commercially available peripheral interface chip 415 includes a number of registers which are utilized during the translation. Those registers which are most pertinent to this discussion are shown in FIG. 6. One group of registers includes a status register 223, a read head address register 225, read cylinder address registers 227 and 229 (allows a 16-bit cylinder address), a read starting sector address register 231, and a read sector count register 233. A second group of registers includes a command register 235, a write head address register 237, write cylinder address registers 239 and 241, a write starting sector address register 243, and a write sector count register 245. Each of these registers is accessible to both the host processor 154 and the controller processor 417.

The group of registers provide a temporary place for storing commands from the host computer over the interface lines 138. When the computer system wants to perform a read or write operation, it writes a READ or WRITE command into the command register 235 after writing into the respective sets of registers 225–233 or 237–245 the address, in disk drive terms, of the sectors where the data is to be read or written. This is controlled by the basic input/output system ("BIOS") that is part of the host computer operating system. The microprocessor 417 then reads the command from the command register 235 and the address from the appropriate read or write registers, and determines whether the address is within the disk or flash EEPROM address space. If within the EEPROM address space, the disk address stored in the registers is translated into a flash EEPROM address. Once a command is detected in the register 235, a BUSY signal is written into the status register 223 that the host computer can then read to know that the memory system is in the process of executing a command and cannot receive another. Once a commanded data transfer has been performed, the microprocessor 417 then writes a NOT BUSY indication in the status register 223.

An overall operation of the mass storage system 140, under control of the microprocessor 417, is illustrated by a flow diagram of FIG. 7. A first step 261 is for the command register 235 to be continuously polled in order to detect a command placed there by the host processor 154. A determination as to whether a new command has been written into the register 235 or not is indicated by a block 263. If a new command has not been so written since that register was last accessed, then the steps 261 and 263 are repeated. When a new command is detected, the processing moves to a step 265 where a BUSY status signal is written in the register 223. The host computer, in polling the status register 223, will then not let another command into the command register 235 until a NOT BUSY status is written into the register 223 at the end of the current operation.

If the command is to READ data from the memory system, or to WRITE data into it, as indicated by a block 271, then one of two paths is taken in the processing. If a READ operation is commanded, a step 273 reads the address, in disk drive terms, stored in the registers 225–223 by the host computer. A next step 275 translates that disk address into a physical address in either the disk memory 414 or the flash memory 130, as shown in FIG. 8. A step 289 determines, by reference to a look-up table or equation in software, whether the address is within the disk or solid state memory space. If within the disk space, a step 291 enables the disk storage 414 for the read operation and the address is then translated, if necessary, into an actual physical address where the data is stored. In most cases, however, no such translation is necessary, the address from the host processor 154 being applied directly to the disk storage system 414.

If, on the other hand, the inquiry indicated at step 289 indicates that the address from the host is within the flash EEPROM memory space, a step 295 (FIG. 8) is performed, wherein the flash memory 130 and its controller 401 are enabled for the read operation. The step 297 performs the important function of translating the address in disk format into a solid state memory format, as generally described in FIG. 4 with reference to an address translation block 221. This translation is most easily accomplished by an algorithm calculation or reference to a look up table that have a one-to-one correspondence between the disk address and the EEPROM address.

After the address has been translated into an actual physical one, a next step 276 (FIG. 7) reads data from the addressed location in either disk or flash memory and writes it into the buffer 413.

Thereafter, in a step 277, the read data is compared with an expanded form of an error correction code that has been stored with the data. A common ECC format and algorithm used is used. Next, in a step 278, the read data is transferred to the host computer. Any error that has been detected during the reading process is written into the status register 223, in a step 279. Following that, the step 269 indicates to the host computer that the operation is complete by writing NOT BUSY into the register 223. At that time, the system computer will know that the read operation is complete and that it may access the buffer read memory 247 over the interconnection lines 138 to transfer the read data to somewhere else in the computer system.

Returning to the decision block 271, the path for a WRITE command is similar to that just described for a READ command. A first step 281 in response to such a command is to read the address from registers 237-245, which have been written there by the host computer in disk drive terms. A next step 283 translates that address into an actual disk or solid-state address, in the same manner as described above with respect to FIG. 8. A next step 285 is to execute the command by reading data which has been placed into the write buffer memory 249 by the host computer system and then writing that data into the addressed disk or flash EEPROM location. As indicated by a step 287, a usual ECC is then calculated and stored with the blocks of data. After that is complete, the steps 279 and 269 are executed in the manner discussed above. The process then returns to the beginning steps 261 and 263 to poll the command register 235 for a new command from the host computer system.

In applications where the available power is limited, such in battery supplied computer systems, it is desirable to control the power to at least the disk system. A power control circuit 416 (FIG. 2) is then provided as part of the memory system. This circuit is under the control of the interface microprocessor 417, its operation being indicated in the step 291 of FIG. 8 as part of both a read and write operation. If the disk storage system 414 has its power turned off when the processing reaches the step 291 (FIG. 8), then the microprocessor 417, through the internal bus 413, initiates the disk drive power through the control circuit 416. Thus, the relatively large power consumption of the rotating disk system can be avoided during periods when it is not being used. Indeed, in order to conserve power, the heavily used data or programs can be stored in the flash system 130 so that the disk system can enjoy significant periods with a power down status. The disk system can be used to store large volumes of less frequently accessed information.

A power control circuit 405 is also provided for the flash EEPROM system 130, primarily to supply the precise voltages and timing for the solid-state memory operation. This may also have a power control feature added, and, if it exists, the processing step 295 (FIG. 8) causes the circuits 405 to initiate power to the system 130 if it is then is in a power down status. Although the solid-state memory does not consume nearly as much power as the disk drive, it is certainly desirable nonetheless to conserve it when the flash memory is not being accessed.

With reference to FIGS. 9A and 9B, two alternate memory mapping schemes for the system of FIG. 2 are shown as exemplary. In FIG. 9A, a designation by the host processor 154 to access disk drive C causes only the disk memory 414 to be addressed, while designation of disk drive D causes only the flash EEPROM memory 130 to be accessed. In FIG. 9B, address space within each of the logical disk drives C and D is divided between the hard disk 414 and flash EEPROM 130. Many specific memory sharing and mapping arrangements can be employed, depending upon the intended use of the computer system in which the mass memory 140 is a part, by including the appropriate look-up address translation table or formula provided as part of the controlling program of the microprocessor 417.

Although the various aspects of the present invention have been described with respect to their preferred embodiments, it will be understood that the invention is entitled to protection within the full scope of the appended claims.

It is claimed:

1. A method of configuring and operating a mass storage system as part of a computer system that also includes a central processor connected to communicate with the mass storage system over a common system bus, wherein the central processor is programmed to address data within individual sectors in an entire memory space of the mass storage system over said bus with a given disk drive format, comprising the steps of:

providing as the mass storage system both a rotating disk drive memory and a solid-state flash electrically erasable and programmable read only memory that are connected through a controller to the common system bus to receive addresses from the central processor, partitioning each of the disk drive and solid-state memory into individually addressable sectors that each store a given amount of data, designating within the controller first and second non-overlapping portions of the mass memory address space, the first portion being implemented by the disk drive memory and the second portion being implemented by the solid state memory, causing the controller to access a data sector within the disk drive when an address received in said given disk drive format from the central processor over the system bus is within said first address space portion, and causing the controller to access a data sector within the solid state memory when an address received in said given disk drive format from the central processor over the system bus is within said second address space portion, including a step of translating the address from the central processor within the second address space portion into a physical address of a data sector of the solid state memory.

2. The method according to claim 1 wherein the step of designating portions of the address space includes the step of designating substantially all memory space addresses within one logical disk drive to be within either said first portion or said second portion but not both.

3. The method according to claim 1 wherein the step of designating portions of the address space includes the step of designating addresses within at least one logical disk drive within both of the first and second address portions.

4. The method according to claim 1 wherein the central processor is further programmed to address sectors of data in the mass storage system by drive, head, and cylinder locations.

5. The method according to claim 1 wherein said sectors of data are individually substantially 512 bytes in size.

6. The method according to claim 1 which comprises the additional step, prior to the step of causing the controller to access a data sector of the disk drive, of causing the controller to initiate power to the disk drive memory in response to receiving an address within the first address space portion.

7. The method according to claim 1 which comprises the additional step, prior to the step of causing the controller to access a data sector of the solid state memory, of causing the controller to initiate power to the solid state memory in response to receiving an address within the second address space portion.

8. A mass storage system adapted to operate as part of a computer system by connection through a system bus to a central processor that is programmed to address the entire memory space of the mass storage system over said bus by specifying at least one sector of data at a time in a disk drive format, comprising:

a rotating disk drive memory partitioned into individually addressable sectors that individually store a given amount of data, a solid-state flash electrically erasable and programmable read only memory partitioned into individually addressable sectors that individually store said given amount of data, a controller connected to both of the disk drive and solid-state memories for communicating between said memories and the central processor over the system bus, means within the controller for accessing at least one of the data sectors within the disk drive when an address received in said disk drive format from the central processor over the system bus is within a first portion of the mass memory address space, and means within the controller for accessing at least one of the data sectors within the solid state memory when an address received in said disk drive format from the central processor over the system bus is within a second portion of the mass memory address space, said first and second portions of the mass memory address space being non-overlapping.

9. A method of operating a mass storage system having an address space, comprising:

utilizing as the mass storage system both a rotating disk drive memory, a solid-state flash EEPROM array and a controller common to both the disk drive and the solid-state array, each of the disk drive and the solid-state array being partitioned into separately addressable sectors that individually store a given amount of data, operating the mass storage system as part of a computer system that also includes a central processor connected to communicate with the mass storage system, accessing at least one data sector within the disk drive when an address received by the controller in a disk drive format from the central processor is within a first portion of the mass storage system address space, accessing at least one data sector within the solid state memory when an address received by the controller in the disk drive format from the central processor is within a second portion of the mass storage system address space, said first and second address space portions being distinct and non-overlapping, translating the address from the central processor within the second address space portion into a physical address of a data sector of the solid state array, and generating from the central processor and sending to the controller an address in the disk drive format of at least one sector within the mass storage system address space without regard for whether the address is within the first or second portions of the mass storage system address space.

10. The method according to claim 9 wherein generating the address from the central processor includes doing so with a format that designates drive, head, and cylinder locations.

11. The method according to claim 9 wherein said given amount of data stored in the sectors of the disk drive and solid-state array includes 512 bytes of user data.

12. The method according to claim 9 which comprises the additional step, prior to the step of causing the controller to access a data sector of the disk drive, of causing the controller to initiate power to the disk drive memory in response to receiving an address within the first address space portion.

13. The method according to claim 9 which comprises the additional step, prior to the step of causing the controller to access a data sector of the solid state memory, of causing the controller to initiate power to the solid state memory in response to receiving an address within the second address space portion.

14. A memory system, comprising:

a rotating disk drive memory partitioned into sectors of a given amount of data, a solid-state flash EEPROM array partitioned into sectors of said given amount of data, and a memory system controller connected to both the disk drive and the solid-state array, and responsive to receipt of an address of one or more memory sectors in a common disk drive format to access a corresponding one or more sectors of the disk drive when the received address is within a first range of addresses and to access a corresponding one or more sectors of the solid-state array when the received address is within a second range of addresses, said first and second ranges of received addresses being distinct and non-overlapping.

15. The memory system of claim 14, wherein the memory system controller is additionally responsive to receipt of the address within the second range of addresses to translate the received address into a physical address of one or more sectors of the solid-state memory.

16. The memory system of claim 14, wherein the memory system controller is responsive to the common disk drive address format that includes drive, head and cylinder locations.

17. The memory system of claim 14, wherein the given amount of data stored by individual sectors of both the disk drive and solid-state array includes 512 bytes of user data.

18. The memory system of claim 14, wherein the controller additionally includes means responsive to receipt of an address within either of the first or second address ranges for initiating power to a respective one of either the disk drive or solid-state array.

* * * * *